US011068932B2

(12) United States Patent
Shen et al.

(10) Patent No.: US 11,068,932 B2
(45) Date of Patent: Jul. 20, 2021

(54) SYSTEMS AND METHODS FOR PROCESSING OR MINING VISITOR INTERESTS FROM GRAPHICAL USER INTERFACES DISPLAYING REFERRAL WEBSITES

(71) Applicant: WAL-MART STORES, INC., Bentonville, AR (US)

(72) Inventors: Wei Shen, Danville, CA (US); Yuan Xie, Bloomington, IN (US); Vahid Jalalibarsari, Sunnyvale, CA (US); Lu Wang, Sunnyvale, CA (US); Chenxi Liu, Santa Clara, CA (US); Zhao Zhao, Sunnyvale, CA (US)

(73) Assignee: WAL-MART STORES, INC., Bentonville, AR (US)

( * ) Notice: Subject to any disclaimer, the term of this patent is extended or adjusted under 35 U.S.C. 154(b) by 465 days.

(21) Appl. No.: 15/839,452

(22) Filed: Dec. 12, 2017

(65) Prior Publication Data
US 2019/0180321 A1    Jun. 13, 2019

(51) Int. Cl.
*G06Q 30/02* (2012.01)
*H04L 12/58* (2006.01)
(Continued)

(52) U.S. Cl.
CPC ......... *G06Q 30/0251* (2013.01); *G06F 40/10* (2020.01); *G06F 40/284* (2020.01);
(Continued)

(58) Field of Classification Search
CPC ........... G06Q 30/0251; G06Q 30/0613; G06Q 30/0276; G06Q 30/0255; G06Q 30/0263; G06Q 30/0271; G06F 40/10
See application file for complete search history.

(56) References Cited

U.S. PATENT DOCUMENTS 8,781,231 B1 * 7/2014 Kumar .................... G06F 16/54
382/190
9,542,649 B2 * 1/2017 Su ............................. G06N 5/04
(Continued)

OTHER PUBLICATIONS

Blei, David M. et al., "Latent Dirichlet Allocation," 3 J. Machine Learning Research, pp. 993-1022 2003.

*Primary Examiner* — David J Stoltenberg
*Assistant Examiner* — Robert C Johnson
(74) *Attorney, Agent, or Firm* — Bryan Cave Leighton Paisner LLP

(57) ABSTRACT

Systems and methods including one or more processing modules and one or more non-transitory storage modules storing computing instructions configured to run on the one or more processing modules and perform acts of obtaining a uniform resource locator (URL) of a first webpage that is shown on a graphical user interface and that is external to a website of a retailer (where, in some embodiments, the URL is obtained from a referral website or is entered by a user from a chat window or search box), using a web scraper to extract web text displayed on the first webpage on the graphical user interface, processing the web text displayed on the first webpage on the graphical user interface to determine an interest of a user, using a set of rules to determine items related to the web text displayed on the first webpage on the graphical user interface, and coordinating displaying the items on a second webpage to promote the items as related to the interest of the user, where the second webpage is internal or external to the website of the retailer.

20 Claims, 12 Drawing Sheets

(51) Int. Cl.
*H04L 29/08* (2006.01)
*G06Q 30/06* (2012.01)
*G06F 40/10* (2020.01)
*G06F 40/284* (2020.01)

(52) U.S. Cl.
CPC ......... *G06Q 30/0613* (2013.01); *H04L 51/04* (2013.01); *H04L 67/02* (2013.01); *H04L 67/146* (2013.01)

(56) References Cited

U.S. PATENT DOCUMENTS

| | | | | |
|---|---|---|---|---|
| 2004/0059632 | A1* | 3/2004 | Kang | G06Q 30/0256 705/14.54 |
| 2004/0107137 | A1* | 6/2004 | Skinner | G06Q 30/08 705/14.46 |
| 2011/0106617 | A1* | 5/2011 | Cooper | G06Q 30/0241 705/14.49 |
| 2011/0258536 | A1* | 10/2011 | Monsarrat | G06F 16/22 715/235 |
| 2012/0310914 | A1* | 12/2012 | Khan | G06F 16/951 707/710 |
| 2013/0212110 | A1* | 8/2013 | Stankiewicz | G06Q 30/0631 707/740 |
| 2014/0207782 | A1* | 7/2014 | Ravid | G06F 16/285 707/739 |
| 2014/0279250 | A1* | 9/2014 | Williams | G06Q 30/0255 705/26.62 |
| 2014/0379458 | A1* | 12/2014 | Bell | G06Q 30/0255 705/14.41 |
| 2015/0170248 | A1* | 6/2015 | Chung | G06Q 30/0601 705/26.63 |

* cited by examiner

400

405 – Obtaining a uniform resource locator (URL) of a first webpage that is external to a website of an online retailer.

410 – Extracting, using a web scraper, web text displayed on the first webpage.

415 – Processing the web text displayed on the first webpage to determine an interest of a user.

420 – Determining, using a set of rules, one or more items related to the web text displayed on the first webpage, as processed.

425 – Coordinating displaying the one or more items on a second webpage to promote the one or more items as related to the interest of the user, the second webpage being internal or external to the website of the online retailer.

FIG. 4

SYSTEMS AND METHODS FOR PROCESSING OR MINING VISITOR INTERESTS FROM GRAPHICAL USER INTERFACES DISPLAYING REFERRAL WEBSITES

TECHNICAL FIELD

This disclosure relates generally to processing or mining visitor interests from graphical user interfaces displaying websites that refer a user to the website of a retailer.

BACKGROUND

As the popularity of retailer websites has risen, many retailers promote items available for purchase on their websites by displaying advertisements on webpages displayed on graphical user interfaces, where the webpages are external to the websites of the retailers. These external webpages can contain a significant amount of information about users that select the advertisements displayed on the external (referral) webpages, especially if the advertisements are unrelated to the external (referral) webpages.

BRIEF DESCRIPTION OF THE DRAWINGS

To facilitate further description of the embodiments, the following drawings are provided in which:

FIG. 4 is a flowchart for a method, according to certain embodiments;

Figure 1:
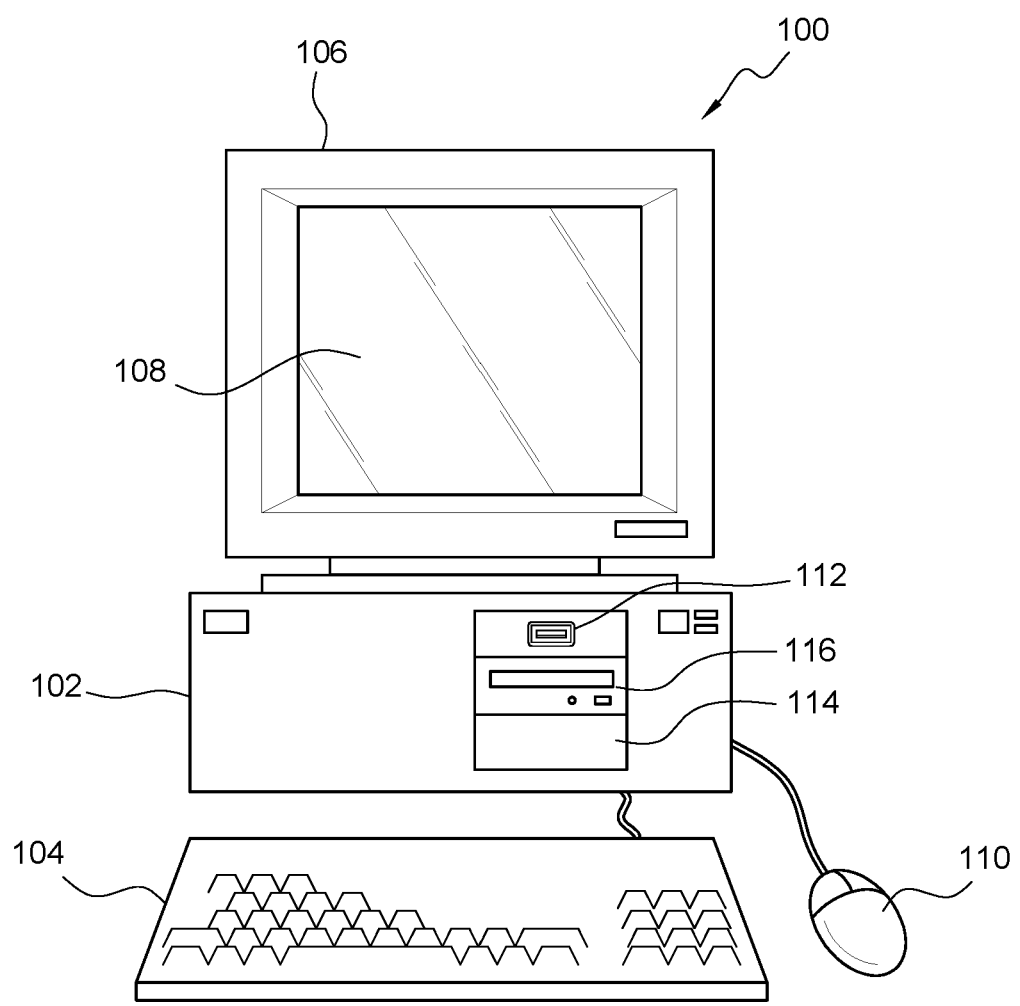
FIG. 1 illustrates a front elevational view of a computer system that is suitable for implementing various embodiments of the systems disclosed in FIGS. 3 and 5.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, two seconds, five seconds, or ten seconds.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

A number of embodiments can include a system. The system can include one or more processors and one or more computer-readable media storing computing instructions configured to run on the processors. The one or more computer-readable media can be configured to run on the one or more processors and perform an act of obtaining a uniform resource locator (URL) of a first webpage that is external to a website of a retailer. The one or more computer-readable media can be further configured to run on the one or more processors and perform an act of extracting, using a web scraper, web text displayed on the first webpage. The one or more computer-readable media can be further configured to run on the one or more processors and perform an act of processing the web text displayed on the first webpage to determine an interest of a user. The one or more computer-readable media can be further configured to run on the one or more processors and perform an act of determining, using a set of rules, one or more items offered for sale by or on behalf of the retailer and related to the web text displayed on the first webpage, as processed. The one or more computer-readable media can be further configured to run on the one or more processors and perform an act of coordinating displaying the one or more items on a second webpage to promote the one or more items as related to the interest of the user, the second webpage being internal or external to the website of the retailer.

Various embodiments include a method. The method can include obtaining a URL of a first webpage that is external to a website of a retailer. The method also can include extracting, using a web scraper, web text displayed on the first webpage. The method also can include processing the web text displayed on the first webpage to determine an interest of a user. The method also can include determining, using a set of rules, one or more items offered for sale by or on behalf of the retailer and related to the web text displayed on the first webpage, as processed. The method also can include coordinating displaying the one or more items on a second webpage to promote the one or more items as related to the interest of the user, the second webpage being internal or external to the website of the retailer.

A number of embodiments can include a system. The system can include one or more processors and one or more computer-readable media storing computing instructions configured to run on the processors. The one or more computer-readable media can be configured to run on the one or more processors and perform an act of coordinating displaying, on a first webpage that is external to a website for a retailer, an advertisement for an advertised item that is available for purchase on the website of the retailer. The one or more computer-readable media can be further configured to run on the one or more processors and perform an act of obtaining a URL of the first webpage when the user selects the advertisement for the advertised item displayed on the first webpage and is directed to the website of the retailer, the first webpage being external to the website for the retailer. The one or more computer-readable media can be further configured to run on the one or more processors and perform an act of extracting web text displayed on the first webpage. The one or more computer-readable media can be further configured to run on the one or more processors and perform an act of coordinating displaying, on a second webpage, one or more items related to the web text displayed on the first webpage. The one or more items can be offered for sale by or on behalf of the retailer and determined to be related to the web text using a set of rules, and the second webpage can be internal or external to the website of the retailer.

Figure 2:
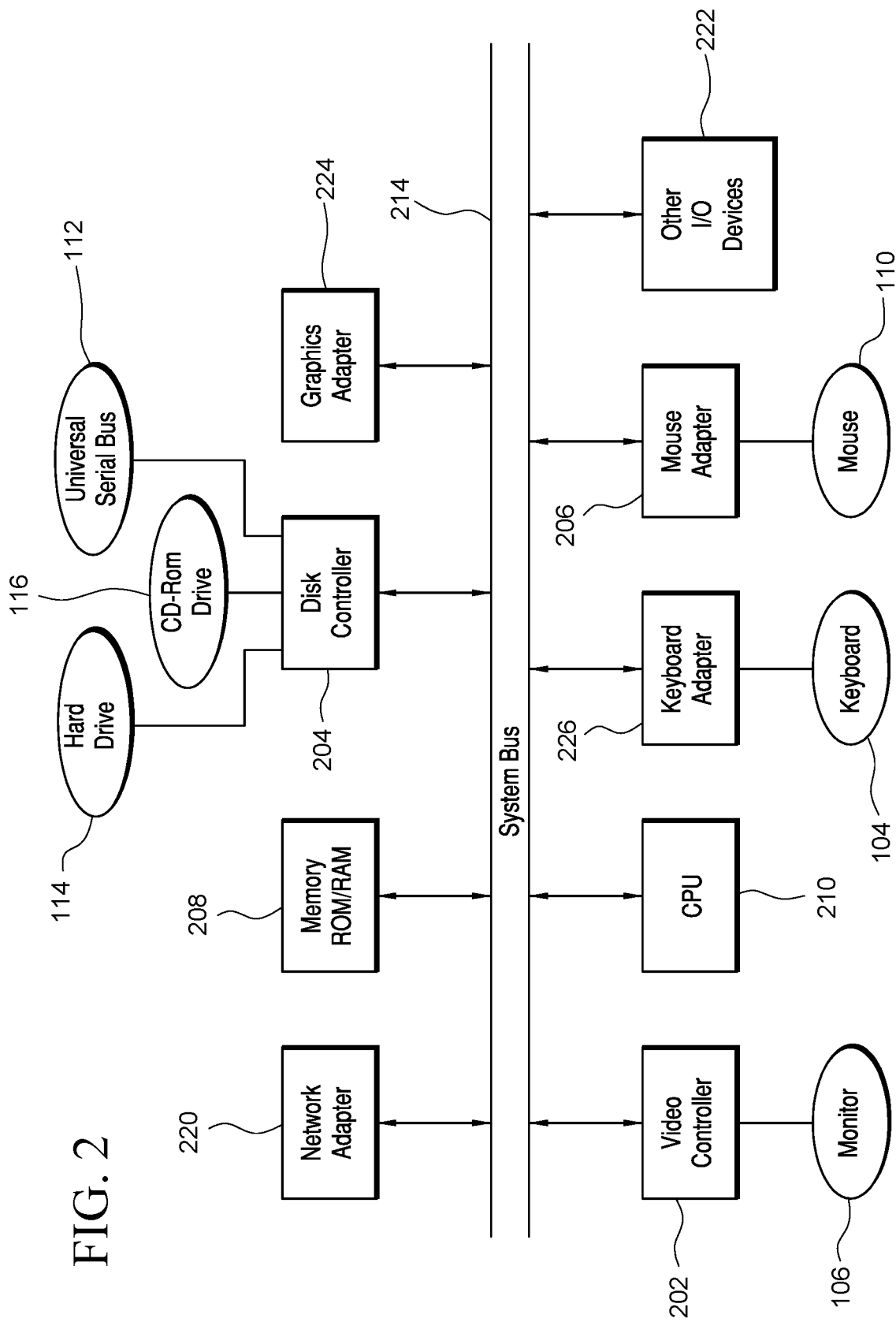
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage modules described herein. As an example, a different or separate one of a chassis 102 (and its internal components) can be suitable for implementing part or all of one or more embodiments of the techniques, methods, and/or systems described herein. Furthermore, one or more elements of computer system 100 (e.g., a monitor 106, a keyboard 104, and/or a mouse 110, etc.) also can be appropriate for implementing part or all of one or more embodiments of the techniques, methods, and/or systems described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) non-volatile memory, such as, for example, read only memory (ROM) and/or (ii) volatile memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. In these or other embodiments, memory storage unit 208 can comprise (i) non-transitory memory and/or (ii) transitory memory.

In various examples, portions of the memory storage module(s) of the various embodiments disclosed herein (e.g., portions of the non-volatile memory storage module (s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 100 (FIG. 1). In the same or different examples, portions of the memory storage module(s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise one of the following: (i) Microsoft® Windows® operating system (OS) by Microsoft Corp. of Redmond, Wash., United States of America, (ii) Mac® OS X by Apple Inc. of Cupertino, Calif., United States of America, (iii) UNIX®

OS, and (iv) Linux® OS. Further exemplary operating systems can comprise one of the following: (i) the iOS® operating system by Apple Inc. of Cupertino, Calif., United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, Calif., United States of America, (v) the Windows Mobile™ operating system by Microsoft Corp. of Redmond, Wash., United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 210.

Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs. In many embodiments, an application specific integrated circuit (ASIC) can comprise one or more processors or microprocessors and/or memory blocks or memory storage.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage module(s) of the various embodiments disclosed herein can be executed by CPU 210 (FIG. 2). At least a portion of the program instructions, stored on these devices, can be suitable for carrying out at least part of the techniques and methods described herein.

Further, although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile electronic device, such as a smartphone. In certain additional embodiments, computer system 100 may comprise an embedded system.

Figure 3:
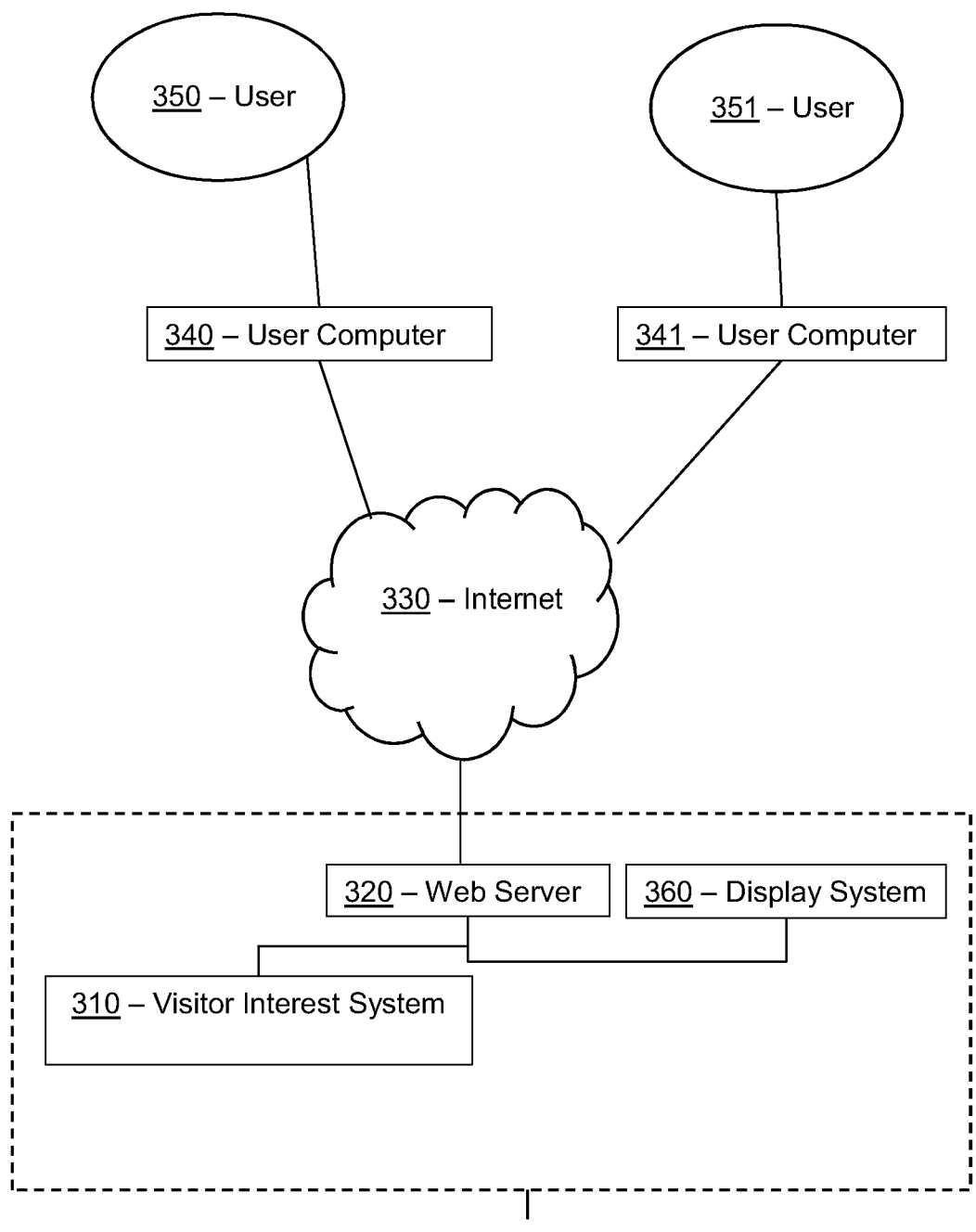
FIG. 3 illustrates a representative block diagram of a system, according to an embodiment.

Turning ahead in the drawings, FIG. 3 illustrates a block diagram of a system 300 that can be employed mining visitor interests from referral websites, as described in greater detail below. System 300 is merely exemplary and embodiments of the system are not limited to the embodiments presented herein. System 300 can be employed in many different embodiments or examples not specifically depicted or described herein. In some embodiments, certain elements or modules of system 300 can perform various procedures, processes, and/or activities. In these or other embodiments, the procedures, processes, and/or activities can be performed by other suitable elements or modules of system 300.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In some embodiments, system 300 can include a visitor interest system 310, a web server 320, and a display system 360. Visitor interest system 310, web server 320, and/or display system 360 can each be a computer system, such as computer system 100 (FIG. 1), as described above, and can each be a single computer, a single server, or a cluster or collection of computers or servers, or a cloud of computers or servers. In another embodiment, a single computer system can host each of two or more of visitor interest system 310, web server 320, and/or display system 360. Additional details regarding visitor interest system 310, web server 320, and display system 360 are described herein.

In many embodiments, system 300 also can comprise user computers 340, 341. User computers 340, 341 can comprise any of the elements described in relation to computer system 100. In some embodiments, user computers 340, 341 can be mobile devices. A mobile electronic device can refer to a portable electronic device (e.g., an electronic device easily conveyable by hand by a person of average size) with the capability to present audio and/or visual data (e.g., text, images, videos, music, etc.). For example, a mobile electronic device can comprise at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile electronic device can comprise a volume and/or weight sufficiently small as to permit the mobile electronic device to be easily conveyable by hand. For examples, in some embodiments, a mobile electronic device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile electronic device can weigh less than or equal to 15.6 Newtons, 17.8 Newtons, 22.3 Newtons, 31.2 Newtons, and/or 44.5 Newtons.

Exemplary mobile electronic devices can comprise (i) an iPod®, iPhone®, iTouch®, iPad®, MacBook® or similar product by Apple Inc. of Cupertino, Calif., United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile electronic device can comprise an electronic device configured to implement one or more of (i) the iPhone® operating system by Apple Inc. of Cupertino, Calif., United States of America, (ii) the Blackberry® operating system by Research In Motion (RIM) of Waterloo, Ontario, Canada, (iii) the Palm® operating system by Palm, Inc. of Sunnyvale, Calif., United States, (iv) the Android™ operating system developed by the Open Handset Alliance, (v) the Windows Mobile™ operating system by Microsoft Corp. of Redmond, Wash., United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can comprise a mobile electronic device, and vice versa. However, a wearable user computer device does not necessarily comprise a mobile electronic device, and vice versa.

In specific examples, a wearable user computer device can comprise a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can comprise (i) Google Glass™ product or a similar product by Google Inc. of Menlo Park, Calif., United States of America; (ii) the Eye Tap™ product, the Laser Eye Tap™ product, or a similar product by ePI Lab of Toronto, Ontario, Canada, and/or (iii) the Raptyr™ product, the STAR1200™ product, the Vuzix Smart Glasses M100™ product, or a similar product by Vuzix Corporation of Rochester, N.Y., United States of America. In other specific examples, a head mountable wearable user computer device can comprise the Virtual Retinal Display™ product, or similar product by the University of Washington of Seattle, Wash., United States of America. Meanwhile, in further specific examples, a limb mountable wearable user computer device can comprise the iWatch™ product, or similar product by Apple Inc. of Cupertino, Calif., United States of America, the Galaxy Gear or similar product of Samsung Group of Samsung Town, Seoul, South Korea, the Moto 360 product or similar product of Motorola of Schaumburg, Ill., United States of America, and/or the Zip™ product, One™ product, Flex™ product, Charge™ product, Surge™ product, or similar product by Fitbit Inc. of San Francisco, Calif., United States of America.

In some embodiments, web server 320 can be in data communication through Internet 330 with user computers (e.g., 340, 341). In certain embodiments, user computers 340-341 can be desktop computers, laptop computers, smart phones, tablet devices, and/or other endpoint devices. Web server 320 can host one or more websites. For example, web server 320 can host an eCommerce website that allows users to browse and/or search for products, to add products to an electronic shopping cart, and/or to purchase products, in addition to other suitable activities.

In many embodiments, visitor interest system 310, web server 320, and/or display system 360 can each comprise one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to the processing module(s) and/or the memory storage module(s) visitor interest system 310, web server 320, and/or display system 360 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processing module(s) and/or the memory storage module(s). In some embodiments, the KVM switch also can be part of visitor interest system 310, web server 320, and/or display system 360. In a similar manner, the processing module(s) and the memory storage module(s) can be local and/or remote to each other.

In many embodiments, visitor interest system 310, web server 320, and/or display system 360 can be configured to communicate with one or more user computers 340 and 341. In some embodiments, user computers 340 and 341 also can be referred to as customer computers. In some embodiments, visitor interest system 310, web server 320, and/or display system 360 can communicate or interface (e.g., interact)

with one or more customer computers (such as user computers 340 and 341) through a network or internet 330. Internet 330 can be an intranet that is not open to the public. Accordingly, in many embodiments, visitor interest system 310, web server 320, and/or display system 360 (and/or the software used by such systems) can refer to a back end of system 300 operated by an operator and/or administrator of system 300, and user computers 340 and 341 (and/or the software used by such systems) can refer to a front end of system 300 used by one or more users 350 and 351, respectively. In some embodiments, users 350 and 351 also can be referred to as customers, in which case, user computers 340 and 341 can be referred to as customer computers. In these or other embodiments, the operator and/or administrator of system 300 can manage system 300, the processing module(s) of system 300, and/or the memory storage module(s) of system 300 using the input device(s) and/or display device(s) of system 300.

Meanwhile, in many embodiments, visitor interest system 310, web server 320, and/or display system 360 also can be configured to communicate with one or more databases. The one or more databases can comprise a product database that contains information about products, items, or SKUs (stock keeping units) sold by a retailer. The one or more databases can be stored on one or more memory storage modules (e.g., non-transitory memory storage module(s)), which can be similar or identical to the one or more memory storage module(s) (e.g., non-transitory memory storage module(s)) described above with respect to computer system 100 (FIG. 1). Also, in some embodiments, for any particular database of the one or more databases, that particular database can be stored on a single memory storage module of the memory storage module(s), and/or the non-transitory memory storage module(s) storing the one or more databases or the contents of that particular database can be spread across multiple ones of the memory storage module(s) and/or non-transitory memory storage module(s) storing the one or more databases, depending on the size of the particular database and/or the storage capacity of the memory storage module(s) and/or non-transitory memory storage module(s).

The one or more databases can each comprise a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, communication between visitor interest system 310, web server 320, and/or display system 360, and/or the one or more databases can be implemented using any suitable manner of wired and/or wireless communication. Accordingly, system 300 can comprise any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can comprise Bluetooth, Zigbee, Wireless Universal Serial Bus (USB), Z-Wave, etc.; exemplary LAN and/or WAN protocol(s) can comprise Institute of Electrical and Electronic Engineers (IEEE) 802.3 (also known as Ethernet), IEEE 802.11 (also known as WiFi), etc.; and exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can comprise wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.).

Figure 5:
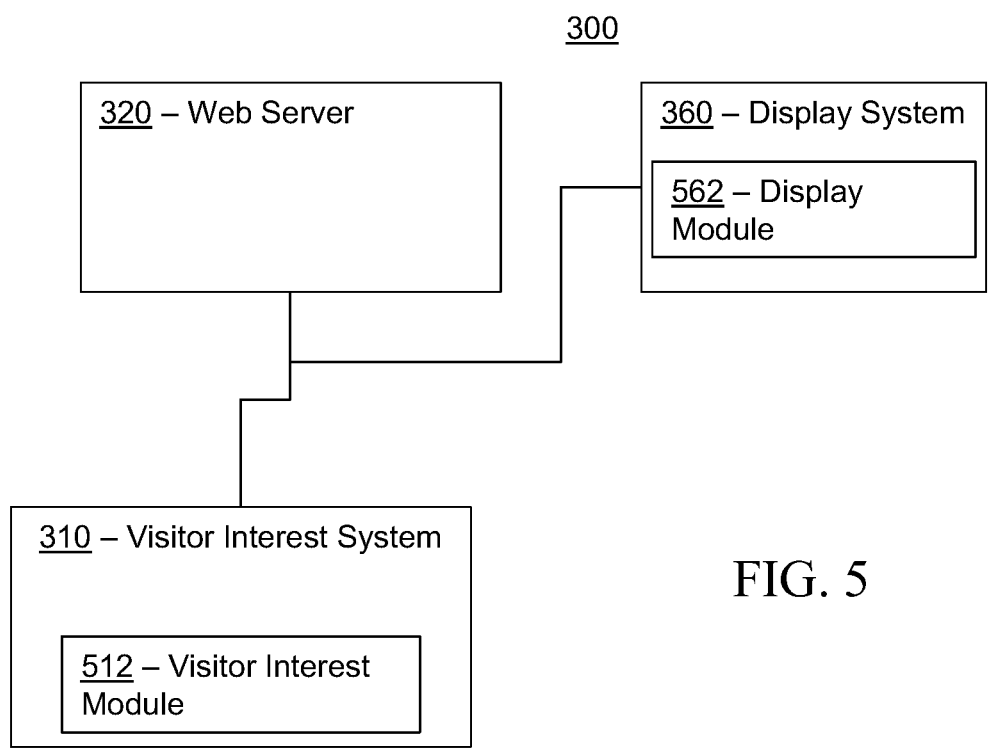
FIG. 5 illustrates a representative block diagram of a portion of the system of FIG. 3, according to an embodiment.

Turning ahead in the drawings, FIG. 4 illustrates a flow chart for a method 400, according to an embodiment. Method 400 is merely exemplary and is not limited to the embodiments presented herein. Method 400 can be employed in many different embodiments or examples not specifically depicted or described herein. In some embodiments, the activities of method 400 can be performed in the order presented. In other embodiments, the activities of method 400 can be performed in any suitable order. In still other embodiments, one or more of the activities of method 400 can be combined or skipped. In many embodiments, system 300 (FIG. 3) can be suitable to perform method 400 and/or one or more of the activities of method 400. In these or other embodiments, one or more of the activities of method 400 can be implemented as one or more computer instructions configured to run at one or more processing modules and configured to be stored at one or more non-transitory memory storage modules 512 and/or 562 (FIG. 5). Such non-transitory memory storage modules can be part of a computer system such as visitor interest system 310, web server 320, and/or display system 360 (FIGS. 3 & 5). The processing module(s) can be similar or identical to the processing module(s) described above with respect to computer system 100 (FIG. 1).

Various embodiments of method 400 and related systems are configured to mine interests of visitors from referral websites for future customer acquisition. Referral websites can refer to websites external to a website of a retailer where the retailer posts one or more advertisements. For example, while visiting a news webpage and reading a news story about a current event, a user can select an advertisement for the retailer also displayed on the news webpage, and then be redirected to the website of the retailer. The external news webpage, then, is a referral webpage. In other embodiments, a user can simply enter the URL for the referral webpage in a window on the website of the retailer. The retailer can be exclusively online or can have a website and one or more brick and mortar stores.

In many embodiments, referral webpages and/or websites can contain a significant amount of information about the user (visitors). Moreover, topics displayed on referral webpages and/or websites are not necessarily similar to the topics displayed by the ads posted. Returning to the example above, when a user is reading an article on the news website, the user is very likely to be interested in the content of the article. For example, if the news story article pertains to "fishing," the reader (user or visitor) is very likely to be interested in fishing. Moreover, the advertisement displayed on the webpage for the news story can be irrelevant to fishing. For example, an advertisement for "stand up desks," which is essentially irrelevant to fishing, can be displayed on a new story webpage about fishing. The information from the external referral webpage can allow the retailer to ascertain interests of user that do not have a significant amount of behavior history on the website of the retailer. Thus, various embodiments of method 400 and related systems are adapted to mine visitor interests from the information contained in the external referral websites and/or webpages.

In many embodiments, method 400 can comprise an activity 405 of obtaining a URL of a webpage that is external to a website of a retailer. In some embodiments, the external website can be referred to as a referral website. For example, the news website and/or webpage referenced above can be referred to as an external or referral website that is external to the website of the retailer. In some embodiments, the website of the retailer can be considered as having a first or top level domain, while the external or referral website can be considered as having a second or lower level domain. In many embodiments, activity 405 is not performed without first receiving consent from the user.

Activity 405 can vary according to different embodiments of this disclosure. For example, in one embodiment, method 400 can optionally comprise an activity of coordinating displaying a user chat window interface on the website of the retailer (as shown in the non-limiting example of FIG. 6C). Method 400 also can optionally comprise an activity of generating instructions for an interface to display a user chat window interface on the website of the retailer. In these and other embodiments, activity 405 can comprise obtaining the URL of the webpage entered into the user chat window interface by the user. The webpage of the URL entered into the user chat window can, in many embodiments, be external to the website of the retailer.

In some embodiments, activity 405 can comprise obtaining the URL of the webpage entered into a search window on the website of the retailer by the user. The webpage of the URL entered into the search window can, in many embodiments, be external to the website of the retailer.

In some embodiments, method 400 can comprise an activity of coordinating displaying, on the webpage that is external to the website for the retailer, an advertisement for an advertised item that is available for purchase on the website of the retailer. Method 400 also can optionally comprise an activity of generating instructions for an interface to display, on the webpage that is external to the website for the retailer, an advertisement for an advertisement item that is available for purchase on the website of the retailer. In these and other embodiments, activity 405 can comprise obtaining the URL of the webpage when the user selects the advertisement for the advertised item displayed on the webpage and is directed to the website of the retailer.

In some embodiments, the website of the retailer can use a beacon tracking cookie (BTC) to mark each user (or visitor) to the website of the retailer because all visitors may not have an account with the retailer. Thus, activity 405 also can comprise collecting the URL for the external webpage using a BTC associated with a user. The information and data extracted from any URL of an external webpage referring the user to the website of the retailer can be linked to the BTC of the browser. Once the BTC has been linked to the browser of the user, when a user uses the same device and browser to visit the website of the retailer, even if the user does not log in, system 300 (FIG. 3) can still identify the user as the person who previously viewed the external referral webpage and was directed to the website of the retailer by selecting the advertisement. The linking of the browser with the BTC can continue until the user clears the cookies from the browser.

In many embodiments, method 400 can comprise an activity 410 of extracting, using a web scraper, web text displayed on the webpage that is external to the website of the retailer. For example, a web scraper can be used to extract web text from a (referral) webpage that also displayed an advertisement for the retailer that was selected by the user, where the (referral) webpage and the advertisement are shown on a graphical user interface. By way of another example, a web scraper can be used to extract web text from a graphical user interface depicting a webpage associated with a URL entered into a user chat window or search box by the user. The web scraper can be a component of system 300 (FIG. 3) or another processor associated with system 300 (FIG. 3).

In many embodiments, method 400 can comprise an activity 415 of processing the web text displayed on the webpage to determine an interest of a user. As noted above, the web text can be from a (referral) webpage that also displayed an advertisement for the retailer that was selected by the user, or can be from a webpage associated with a URL entered into a user chat window or search box by the user.

In more particular embodiments, activity 415 can comprise processing the web text displayed on the webpage to determine the interest of the user, which can comprise (1) tokenizing the web text displayed on the webpage, (2) removing any stop words from the web text displayed on the webpage, and/or (3) creating a reference document (sometimes referred to as a "RefDoc") comprising the web text as tokenized with any stop words removed from the web text. In many embodiments, stop words can comprise common words which would likely be of little value in helping select documents matching an interest of a user. Thus, in some embodiments, activity 415 can include excluding or removing stop words from the web text displayed on the webpage. Examples of stop words can include, but are not limited to, "a," "an," "and," "are," "be," "by," "has," "he," and so on.

In many embodiments, products or items on the website of the retailer can be grouped into different sizes of categories or clusters, such as super departments, departments, divisions and so on. For example, some retailers can have more than fifty departments. Method 400, in some optional embodiments, can comprise, for each category of items of multiple categories of items available for purchase at the website of the retailer, processing description text for the category of items. Description text for each category of items can be processed by (1) tokenizing the description text for the category of items, (2) removing any stop words (as described above) from the description text for the category of items, and (3) creating a category document (sometimes referred to as a "DeptDoc") comprising the description text as tokenized with any stop words removed from the description text.

In many embodiments, method 400 can comprise an activity 420 of determining, using a set of rules, one or more items related to the web text displayed on the webpage, as processed. In some optional embodiments, the one or more items related to the web text displayed on the webpage can be determined using the set of rules by: (1) combining (a) the category document (DeptDoc) and (b) the reference document (RefDoc) for each category of items of the multiple categories of items into a corpus; (2) performing a latent dirichlet allocation (LDA) estimation on the corpus to obtain (a) a user distribution of topics for the user and (b) a category distribution of topics for each category of items of the multiple categories of items; (3) determining Euclidean distances between the user distribution of topics and the category distribution of topics for each category of items of the multiple categories of items; and (4) selecting one or more items from a first category of items of the multiple categories of items comprising a first category distribution of topics that is closest to the user distribution of topics.

As noted above, in some embodiments, LDA can be used for topic modeling. In some embodiments, LDA for topic modeling can assume that, given a corpus of documents and fixed vocabulary, there is a fixed topic space and topic distribution. Each document within the corpus has a distribution on topics, and each topic can have a distribution on the words in the vocabulary. LDA can model the words frequency in each document, as well as that in the entire corpus. The output from performing the LDA estimation can be (1) topic distribution for each user associated with a BTC and for each department, and (2) word distribution for each topic ranked as a first most likely interest, a second most likely interest, and so on. Thus, each document will have a distribution of topics. For each reference document (RefDoc), the Euclidean distances between its distribution with the distribution of every category document (DeptDoc) can be computed, and the N category document (DeptDoc) that are closest to the distribution of the reference document (RefDoc) can be selected. The user associated with the BTC is most likely to be interested in these N departments of products.

In some embodiments, topic modeling using LDA can assume that visitors of the website of the retailer and the product pool on the website of the retailer share the same interests (topic) space. The interests conveyed by the articles on referral websites read by visitors and the description documents of each department of products can be jointly modeled. Specifically, articles on the referral websites and/or webpages can share common words with description documents of products on the website of the retailer. For example, returning the non-limiting example of a news story about fishing, the webpage of the news story about fishing can include words such as "whale," "fisheries," "ocean," "fishing gear," "marine," "swimming," "fisherman," "boats," "poles," and "fishing line." Product description documents of products on the website of the retailer can include words common with the news story, such as "gear," "fishing line," and "fishing."

In some embodiments, activity 420 and other activities in method 400 can comprise using a distributed network comprising distributed memory architecture to perform the associated activity. This distributed architecture can reduce the impact on the network and system resources to reduce congestion in bottlenecks while still allowing data to be accessible from a central location.

In many embodiments, method 400 can comprise an activity 425 of coordinating displaying one or more items on a different webpage to promote the one or more items as related to the interest of the user. In some embodiments, activity 425 can comprise generating instructions for providing an interface that displays one or more items on a different webpage to promote the one or more items as related to the interest of the user. The one or more items can be related to the web text displayed on a first webpage, and the different webpage can be either internal or external to the website of the retailer. For example, in many embodiments, the different (or second) webpage can comprise one of a webpage of the retailer or a webpage of an external website.

In many embodiments, the one or more items related to the web text displayed on a referral webpage can be displayed somewhere on the website of the retailer. For example, the one or more items related to the web text displayed on the referral webpage can be displayed in an item carousel displayed on the website of the retailer (as shown in the non-limiting example of FIG. 6B). In some embodiments, the one or more items related to the web text displayed on the referral webpage can be displayed as an advertisement on a website that is external to the retailer. In some embodiments, the one or more items related to the web text displayed on the referral webpage can be displayed in an email, text message, push message, or other electronic message transmitted to the electronic device of the user.

In some embodiments, activity 425 can comprise coordinating displaying the one or more items related to the web text displayed on the referral webpage on the different webpage during a first session on a web browser to promote the one or more items as related to the interest of the user. The first session on the web browser can be the same browsing session during which the user viewed the external referral webpage or can be a different browsing session occurring after the user viewed the external referral webpage. In some embodiments, however, the one or more items related to the web text displayed on the referral webpage can be displayed during a later browsing session, even after the user has turned off or re-started the user electronic device. For example, method 400 also can comprise an activity of using the BTC to determine that the user has initiated a second session on the web browser, and then coordinating displaying the one or more items on another different webpage during a second, later session on the web browser. The third webpage can be on the website of the retailer or external to the website of the retailer.

Validation of various activities of method 400 and related systems was performed. Many visitors to the website of a retailer have behavior history, such as searching history records, clicking history records, and/or transaction records. These records can be used to validate results of method 400 and related systems.

Qualitative Analysis

Figure 7:
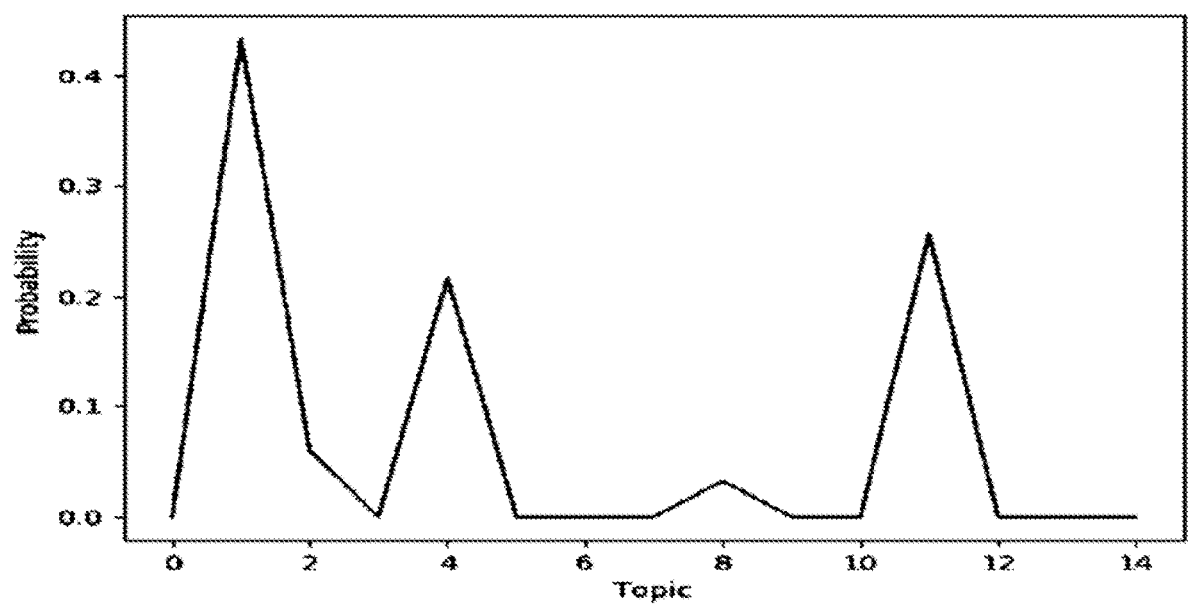
FIG. 7 illustrates a graph of topics versus a probability.

Intuitively, the interests of one visitor should be consistent. In other words, the topics displayed by the webpage visited by the visitor should be consistent with ones conveyed by the products he/she clicks, searches, and/or purchases. Thus, after obtaining the learned distributions, the referral websites, learned topics (described by words), learned distributions and purchase records were manually checked. FIG. 7 shows a graph of the learned distribution of one BTC and compares the interest probabilities of fourteen different topics.

It can be seen that the visitor associated with this BTC has greater interests in the first, fourth, and the eleventh topics. The words for the first topic were: people, that's, wild, tangent, food, news, floss, Friday, July, health, comes, gift, home, rights, life, flossers, job, can't, means, world, and support. The words for the for the fourth topic were: service, save, cancel, matter, fast, pst, sign, Walmart, team, prices, household, description, neighborhood, standing, cost, customer, following, live, ship, and millions. The words for the eleventh topic were: recipe, food, enter, recipes, minutes, rights, size, attach, submitted, love, folder, image, submission, again, serving, submitting, your, folder, please, activity, report, processing, and cream. From these words, a general idea of what topics this visitor associated with the BTC is interested can be obtained.

Next, the referral websites and the purchase records of the visitor associated with the BTC can be checked. The four referral websites for this BTC indicated that the visitor is interested in topics like food, household, recipe, home and so on. Among the items purchased by this user were two items belonging to the "food" department and two items belonging to the "household" department. This demonstrates that the topics displayed in referral websites are consistent with interests conveyed by the products actually purchased.

Quantitative Analysis

Figure 8:
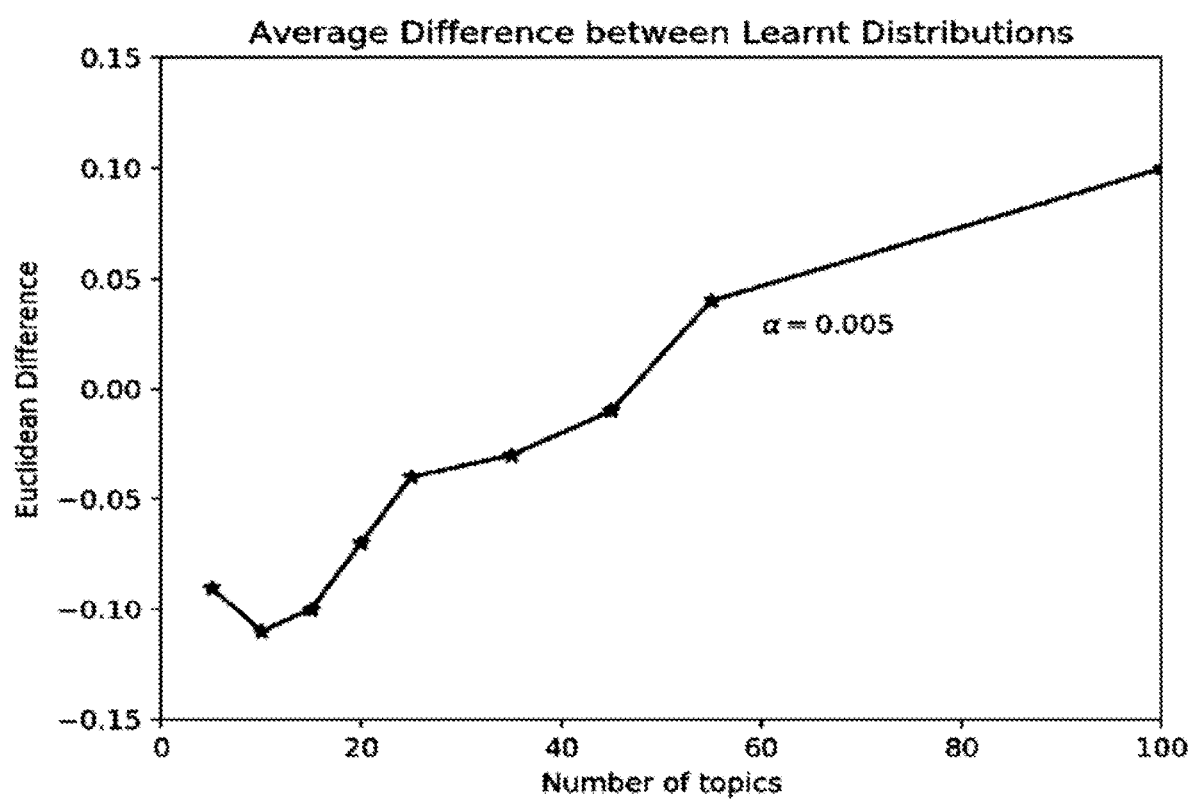
FIG. 8 illustrates a graph of a number of topics versus Euclidean differences.

As validated in the Qualitative Analysis section presented above, topics displayed by referral websites should be consistent with actual interests of visitors. The distribution learned from referral websites, then, should be similar to the distribution learned from behavior history. To verify this assumption, two additional documents for each BTC were assembled. The first document is the words extracted from the description documents of the products that this BTC has searched and clicked, denoted by HistoryDoc. The second document is the words extracted from the description of products of a random department, denoted by RandomDoc. These two types of documents were added to the corpus, and a LDA estimation was run. For each BTC, the distribution learned from HistoryDoc and RandomDoc were compared to the distribution learned from the RefDoc. FIG. 8 shows a graph of the Euclidean distance differences averaged among 495 BTCs. When the number of topics is around 10 to 15, the average distance difference is approximately negative ten percent (−10%), indicating that the distributions learned from HistoryDocs are indeed more similar to the distributions learned from RefDocs.

Figure 9:
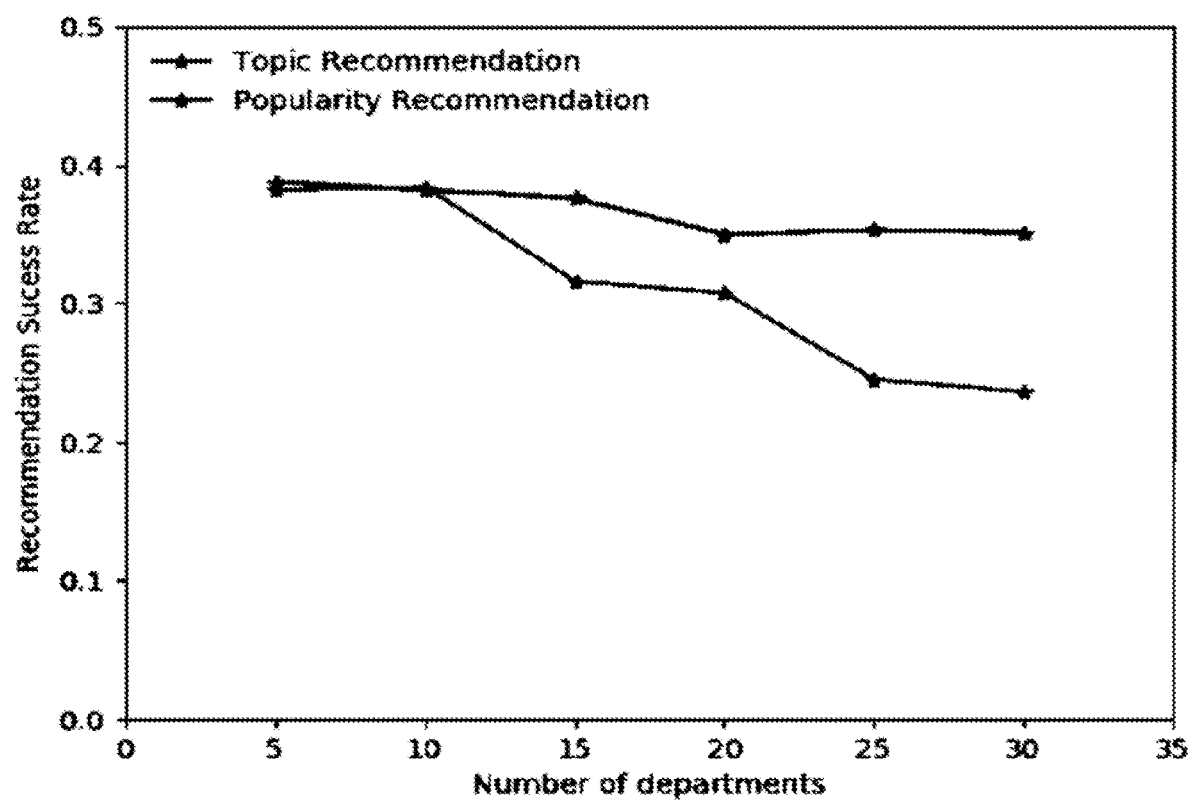
FIG. 9 illustrates a graph of a number of departments versus a recommendation success rate.

Transaction data also can be used to further validate the approaches described herein. Intuitively, if the topic distribution of a BTC is similar to the topic distribution of a department, the visitor associated with the BTC is supposed to be interested in this department and might have some purchase records in this department. Thus, for each BTC, the topic distribution of the BTC was compared with all the departments, and a certain number of departments that are most similar to this BTC were selected for recommendation. The recommended departments were then compared with the departments of products that this BTC actually purchased. A Recommendation Success Rate (RSR) is defined as:

$$\text{Recommendation Success Rate} = \frac{\text{Number of departments actually purchased}}{\text{Number of departments recommended}},$$

where the number of departments actually purchased (Ndp) is the number of departments actually purchased, and where the number of departments recommended (Ndr) is the number of departments recommended. The average RSR is shown compared to the popularity-based approach in a graph in FIG. 9. The graph in FIG. 9 shows that when the number of topics is around 10, the two approaches have almost the same performance.

Figure 10:
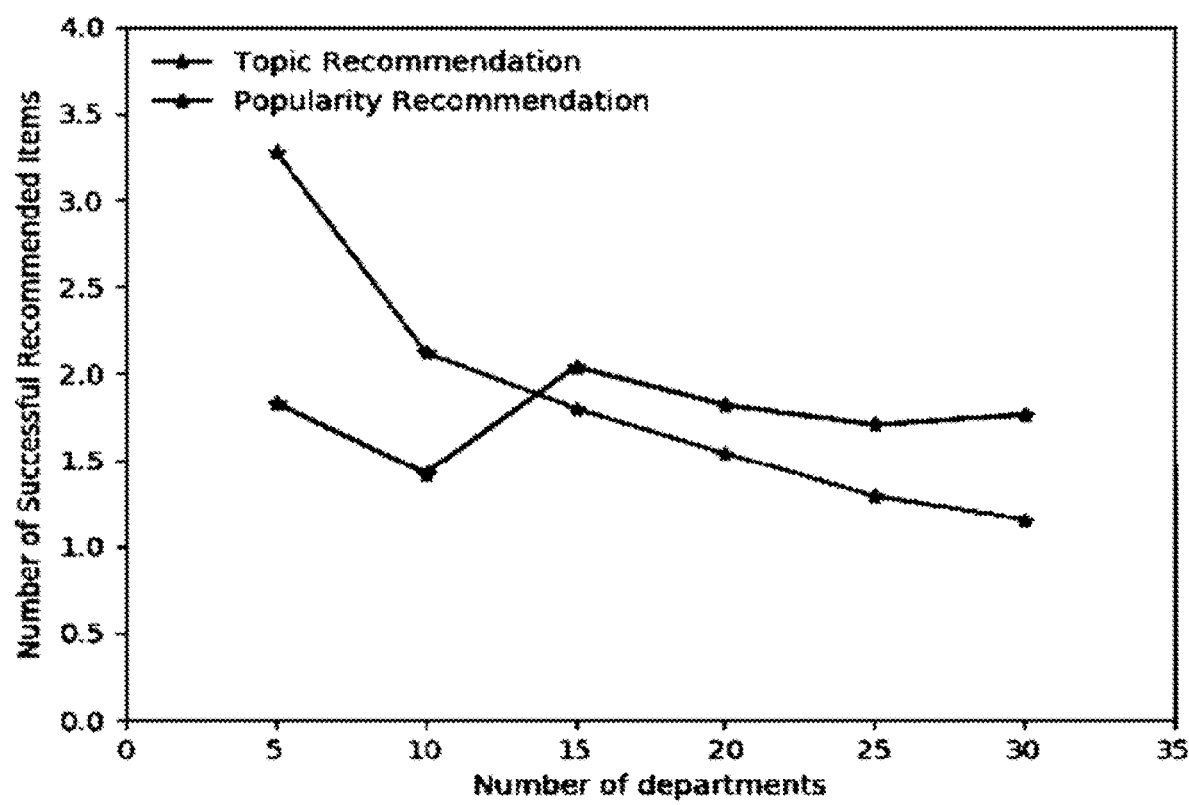
FIG. 10 illustrates a graph of a number of departments versus a number of successful recommended items.

The RSR, however, does not take the quantity of items into consideration. Specifically, one BTC could have multiple purchased items in one department, which could indicate that the visitor associated the BTC is particularly interested in this department. Yet, RSR will only count it as one item. In other words, RSR would not consider the degree to which the visitor associated with BTC is interested in some topic. To circumvent this, another metric was introduced: The Number of Successfully Recommended Items (NSRI). NSRI is the number of items in the purchased history that belong to the recommended departments. The graph in FIG. 10 shows the NSRI for the two approaches. The graph in FIG. 10 also shows that that when the number of departments is around 10, the topic based method has a significant advantage, which is consistent with the rationale of LDA and the referral websites.

It is noted that when the number of departments increases to more than 15, the performance of both approaches start to drop, especially the performance of a topic based approach. This can be caused by the active number of topics of each visitor associated with the BTC being limited. Most of the visitors have purchase records in no more than 10 to 15 departments. Thus, even though there are 53 departments, too many numbers of topics will dramatically affect the model performance.

From the foregoing, it has been shown that because articles on referral websites and description words of products on the website of an online can share common words, it can be assumed that visitors and products share a same topic space. For each visitor, a document can be assembled using text data crawled from referral websites. For each department of products on the website of the retailer, a document can be assembled using the description words. These two documents can be combined into a corpus, and a LDA estimation can be run on the corpus to learn a topic distribution for each document. By comparing the Euclidean distances between the distributions of each document, different numbers of departments can be recommended for each visitor. The behavior history of visitors on the website of the retailer can be used to validate the methods and systems presented herein. Results show that when the number of topics is properly set, a topic distribution can be learned from referral websites.

FIG. 5 illustrates a block diagram of a portion of system 300 comprising visitor interest system 310, web server 320, and display system 360, according to the embodiment shown in FIG. 3. Each of visitor interest system 310, web server 320, and display system 360 is merely exemplary and not limited to the embodiments presented herein. Each of visitor interest system 310, web server 320, and/or display system 360 can be employed in many different embodiments or examples not specifically depicted or described herein. In some embodiments, certain elements or modules of visitor interest system 310, web server 320, and/or display system 360 can perform various procedures, processes, and/or acts. In other embodiments, the procedures, processes, and/or acts can be performed by other suitable elements or modules.

In many embodiments, visitor interest system 310 can comprise non-transitory memory storage module 512. Memory storage module 512 can be referred to as visitor interest module 512. In many embodiments, visitor interest module 512 can store computing instructions configured to run on one or more processing modules and perform one or more acts of method 400 (FIG. 4) (e.g., activity 405 of obtaining a URL of a webpage that is external to a website of a retailer, activity 410 of extracting, using a web scraper, web text displayed on the first webpage, activity 415 of processing the web text displayed on the first webpage to determine an interest of a user, and activity 420 of determining, using a set of rules, one or more items related to the web text displayed on the first webpage, as processed (FIG. 4)).

In many embodiments, display system 360 can comprise non-transitory memory storage module 562. Memory storage module 562 can be referred to as display module 562. In many embodiments, display module 562 can store computing instructions configured to run on one or more processing modules and perform one or more acts of method 400 (FIG. 4) (e.g., activity 425 of coordinating displaying the one or more items on a second webpage to promote the one or more items as related to the interest of the user, the second webpage being internal or external to the website of the retailer (FIG. 4)).

Figure 6A:
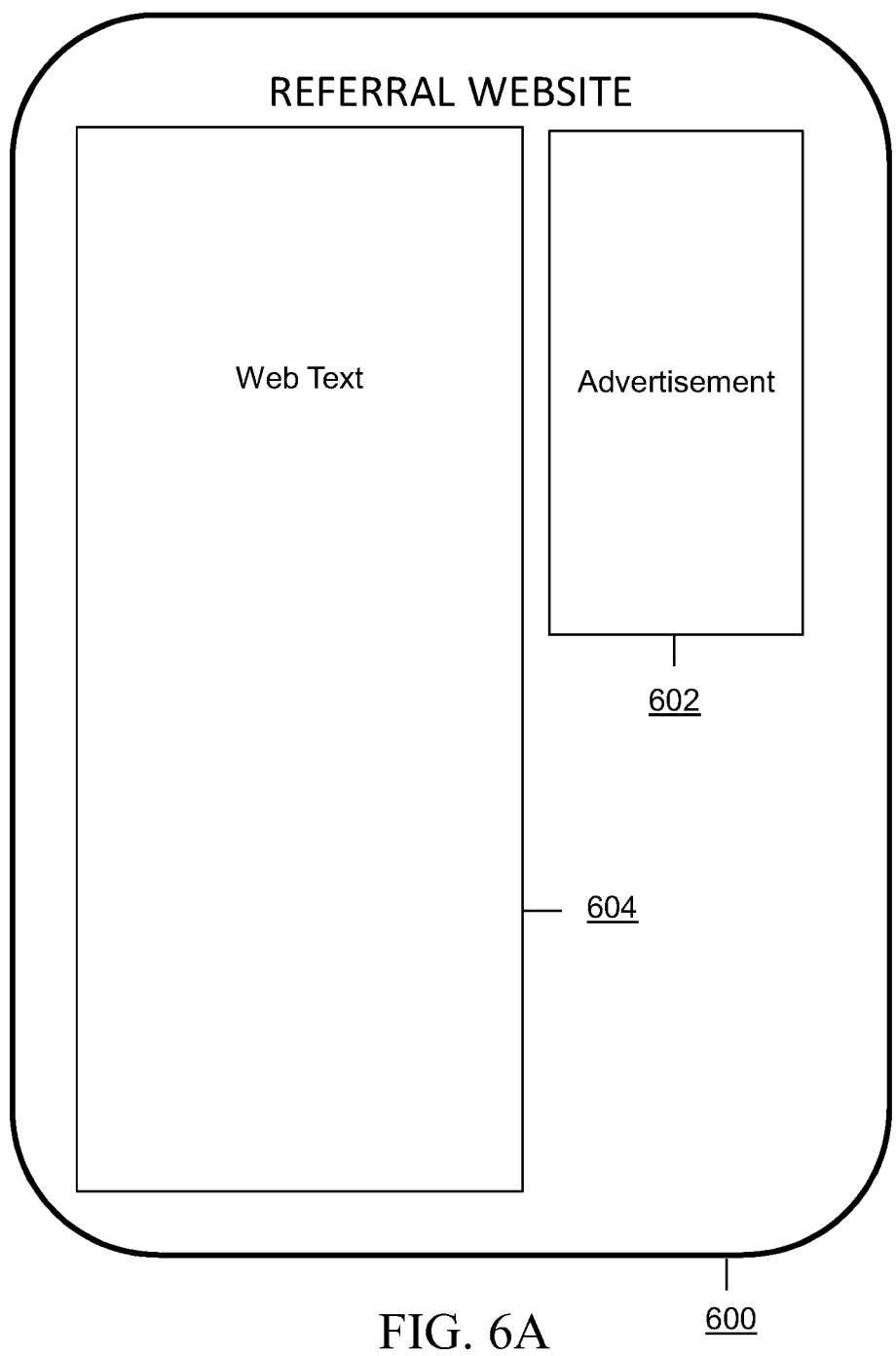
FIGS. 6A-C illustrate representative block diagrams of a user interface, according to an embodiment.

Turning ahead in the drawings to FIG. 6A, which illustrates a diagram of an interface 600. In many embodiments, interface 600 can be displayed on a screen of user computer 340 (FIG. 3). In many embodiments, interface 600 can display, on an external referral website, web text 604 and an advertisement 602 for an item available for purchase from the retailer.

Figure 6B:
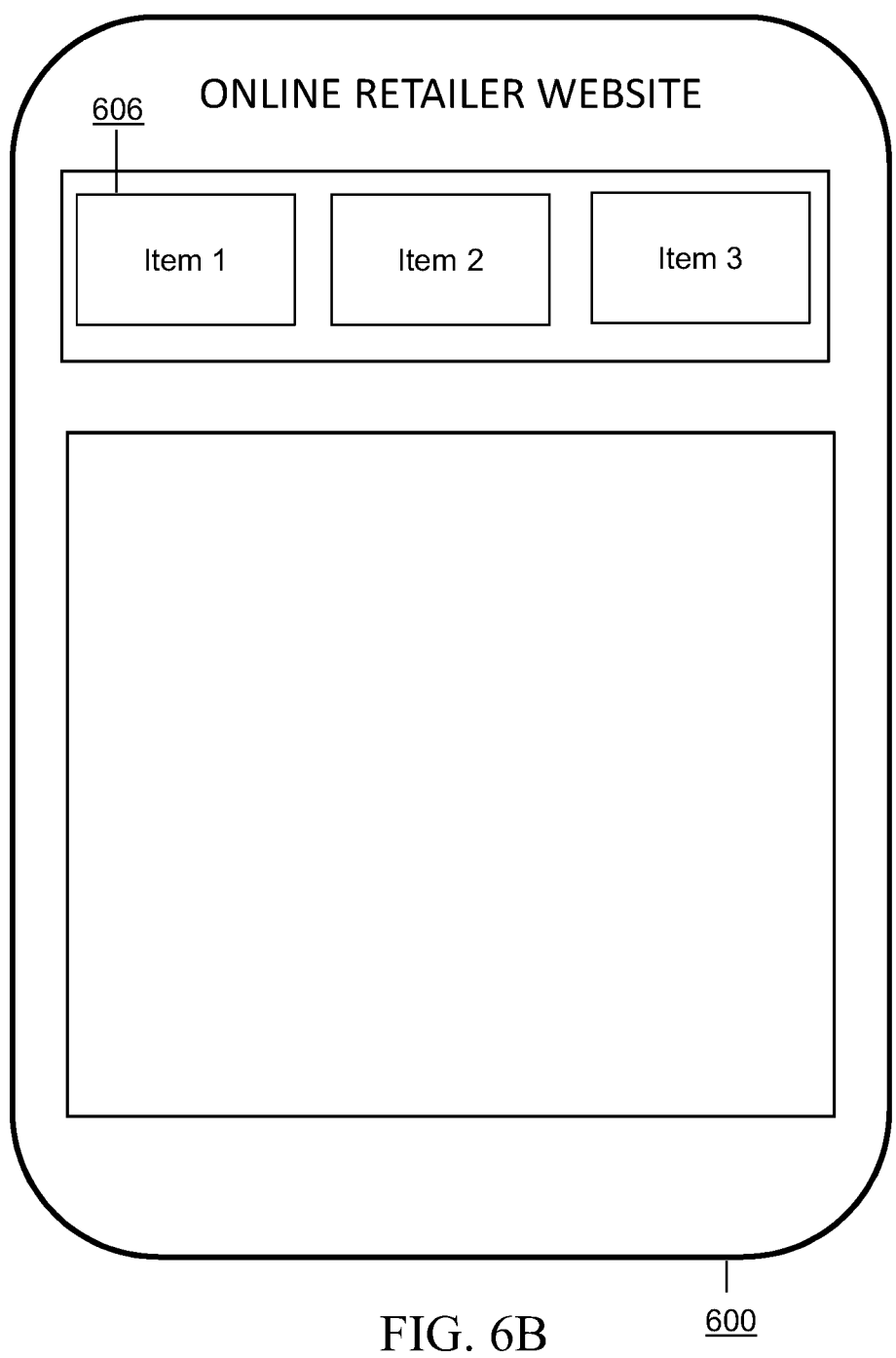

Turning ahead in the drawings to FIG. 6B, which illustrates another diagram of interface 600 at a different point in time. In many embodiments, interface 600 can display, on a webpage different from the external referral webpage shown in FIG. 6A, a set of items 606 related to the web text displayed on the external referral webpage. In FIG. 6B, set of items 606 are displayed in an item carousel displayed on the website of the retailer. In other embodiments, one or more set of items 606 can be displayed on a webpage external to the website of the retailer.

Figure 6C:
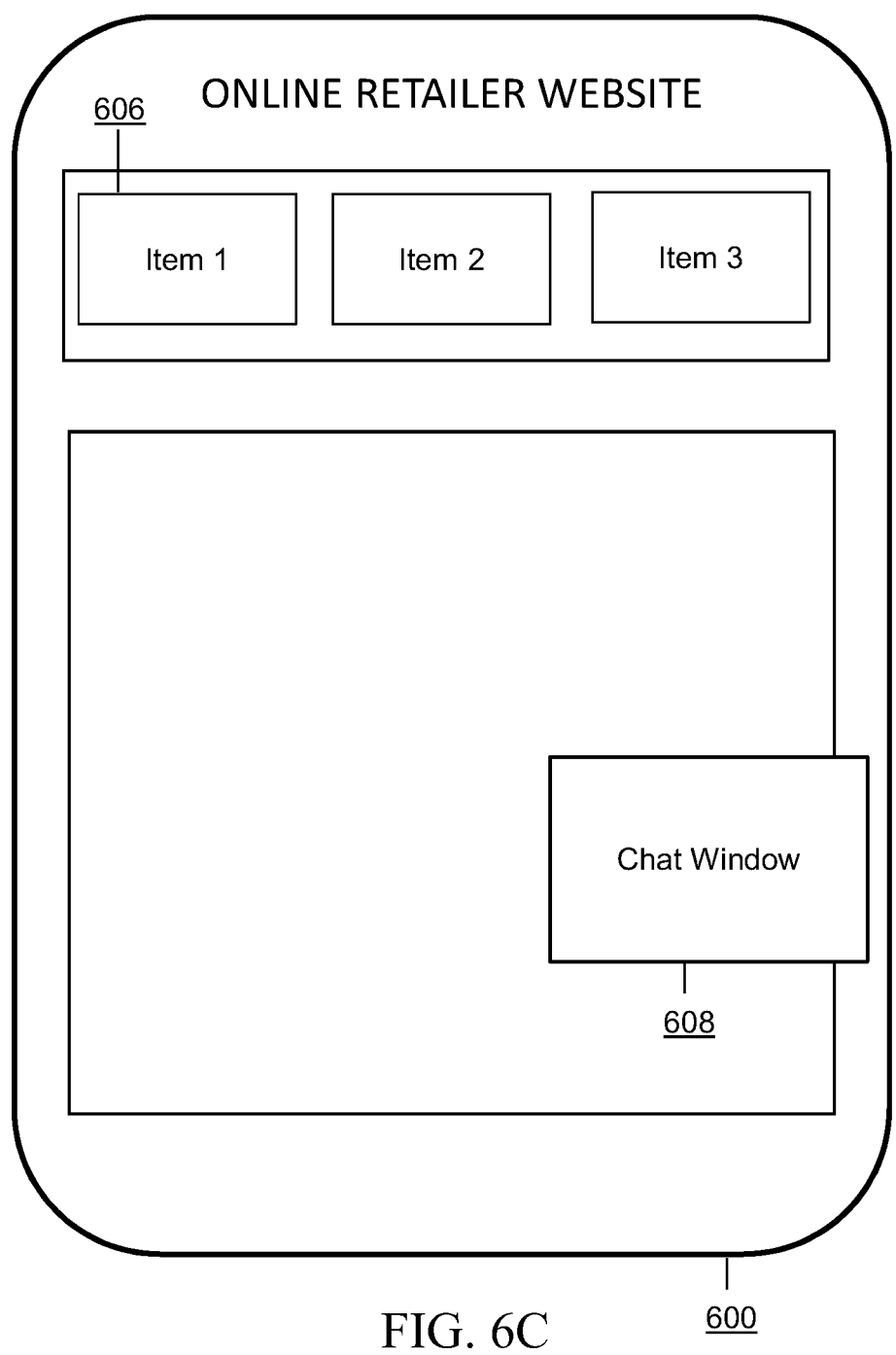

Turning ahead in the drawings to FIG. 6C, which illustrates another diagram of interface 600 at another point in time. In many embodiments, interface 600 can display a user chat window 608 on the website of the retailer. As an example, a user can enter a URL into user chat window 608, and system 300 (FIG. 3) can extract web text from a webpage associated with the URL entered into user chat window 608. After web text has been extracted from the webpage associated with the URL entered into user chat window 608, interface 600 can display one or more additional items related to the web text from the webpage associated with the URL entered into user chat window 608. The one or more additional items can be determined to be related to the web text using any of the activities described elsewhere in this document.

Although systems and methods for mining visitor interests from referral websites have been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-6 may be modified, and that the foregoing discussion of certain of these embodiments does not necessarily represent a complete description of all possible embodiments. For example, one or more of the procedures, processes, or activities of FIG. 4 may include different procedures, processes, and/or activities and be performed by many different modules, in many different orders.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
one or more processors; and
one or more non-transitory computer-readable media storing computing instructions configured to run on the one or more processors and perform:
obtaining a uniform resource locator (URL) of a first webpage that is shown on a graphical user interface of a user and that is external to a website of a retailer;
extracting, using a web scraper, web text displayed on the first webpage on the graphical user interface of the user;
processing the web text displayed on the first webpage on the graphical user interface of the user to determine an interest of the user;
determining, using a set of rules, one or more items related to the web text displayed on the first webpage, as processed, on the graphical user interface of the user, the set of rules comprising:
performing a latent dirichlet allocation (LDA) estimation on a corpus comprising the web text displayed on the first webpage, as processed;
coordinating displaying the one or more items on a second webpage to promote the one or more items as related to the interest of the user, the second webpage being internal or external to the website of the retailer; and
validating the LDA estimation using a user behavior history of the user, the user behavior history collected from the user's interaction with the second webpage after the one or more items are displayed on the second webpage.

2. The system of claim 1, wherein:
the one or more non-transitory computer-readable media storing the computing instructions are further configured to run on the one or more processors and perform:
coordinating displaying a user chat window interface on the website of the retailer on the graphical user interface of the user; and
obtaining the URL of the first webpage that is shown on the graphical user interface of the user and that is external to the website of the retailer comprises:
obtaining the URL of the first webpage entered into the user chat window interface by the user, the first webpage being shown on the graphical user interface of the user and external to the website of the retailer.

3. The system of claim 1, wherein:
the one or more non-transitory computer-readable media storing the computing instructions are further configured to run on the one or more processors and perform:
coordinating displaying, on the first webpage that is external to the website of the retailer, an advertisement for an advertised item that is available for purchase on the website of the retailer, wherein the one or more items comprise the advertised item; and
obtaining the URL of the first webpage that is shown on the graphical user interface of the user and that is external to the website of the retailer comprises:
obtaining the URL of the first webpage when the user selects the advertisement for the advertised item displayed on the first webpage and is directed to the website of the retailer.

4. The system of claim 1, wherein:
coordinating displaying the one or more items on the second webpage to promote the one or more items as related to the interest of the user comprises:
coordinating displaying the one or more items on the second webpage during a first session on a web browser on the graphical user interface of the user to promote the one or more items as offered for sale by or on behalf of the retailer and related to the interest of the user; and
the one or more non-transitory computer-readable media storing the computing instructions are further configured to run on the one or more processors and perform:
using a beacon tracking cookie to determine that the user has initiated a second session on the web browser; and
coordinating displaying the one or more items on a third webpage during the second session on the web browser.

5. The system of claim 1, wherein the second webpage comprises:
an internal webpage of the retailer; or
an external webpage of a third-party.

6. The system of claim 1, wherein processing the web text displayed on the first webpage on the graphical user interface of the user to determine the interest of the user comprises:
tokenizing the web text displayed on the first webpage on the graphical user interface of the user;
removing any first stop words from the web text displayed on the first webpage on the graphical user interface of the user; and
creating a reference document comprising the web text, as tokenized, with the any first stop words removed from the web text.

7. The system of claim 6, wherein:
the one or more non-transitory computer-readable media storing the computing instructions are further configured to run on the one or more processors and perform, for each category of items of multiple categories of items available for purchase at the website of the retailer, processing description text for the category of items by:
tokenizing the description text for the category of items;
removing any second stop words from the description text for the category of items; and
creating a category document comprising the description text, as tokenized, with the any of the second stop words removed from the description text;
the set of rules further comprises:
combining (1) the category document and (2) the reference document for each category of items of the multiple categories of items into the corpus;
determining Euclidean distances between a user distribution of topics and a category distribution of topics for each category of items of the multiple categories of items; and
selecting the one or more items from a first category of items of the multiple categories of items comprising a first category distribution of topics that is closest to the user distribution of topics; and
performing the LDA estimation on the corpus further comprises:
performing the LDA estimation on the corpus to obtain (1) the user distribution of topics for the user and (2) the category distribution of topics for each category of items of the multiple categories of items.

8. The system of claim 1, wherein validating the LDA estimation comprises:
creating a history document comprising descriptions of one or more historic items in the user behavior history of the user;
creating a random document comprising descriptions of one or more randomly selected items from an item catalogue of the retailer; and
comparing the history document to a reference document comprising web text displayed on the first webpage on the graphical user interface of the user;
comparing the random document to the reference document; and
validating the LDA estimation based on the comparisons between (1) the history document and the reference document and (2) the random document and the reference document.

9. The system of claim 1, wherein validating the LDA estimation comprises:
determining a recommendation success rate (RSR) using the user behavior history of the user; and
validating the LDA estimation based on the recommendation success rate.

10. The system of claim 9, wherein determining the RSR comprises using an equation comprising:

$$RSR = \frac{NDP}{NDR},$$

wherein:
the NDP comprises a number of categories of purchased items in the user behavior history of the user; and
the NDR comprises a number of categories of the one or more items.

11. A method being implemented via execution of computing instructions configured to run at one or more processors and configured to be stored at non-transitory computer-readable media, the method comprising:
obtaining a uniform resource locator (URL) of a first webpage that is shown on a graphical user interface of a user and that is external to a website of a retailer;
extracting, using a web scraper, web text displayed on the first webpage on the graphical user interface of the user;
processing the web text displayed on the first webpage on the graphical user interface of the user to determine an interest of the user;

determining, using a set of rules, one or more items related to the web text displayed on the first webpage, as processed, on the graphical user interface of the user, the set of rules comprising:
performing a latent dirichlet allocation (LDA) estimation on a corpus comprising the web text displayed on the first webpage, as processed;
coordinating displaying the one or more items on a second webpage to promote the one or more items as related to the interest of the user, the second webpage being internal or external to the website of the retailer; and
validating the LDA estimation using a user behavior history of the user, the user behavior history collected from the user's interaction with the second webpage after the one or more items are displayed on the second webpage.

12. The method of claim 11, wherein:
the method further comprises:
coordinating displaying a user chat window interface on the website of the retailer on the graphical user interface of the user; and
obtaining the URL of the first webpage that is shown on the graphical user interface of the user and that is external to the website of the retailer comprises:
obtaining the URL of the first webpage entered into the user chat window interface by the user, the first webpage being shown on the graphical user interface of the user and external to the website of the retailer.

13. The method of claim 11, wherein:
the method further comprises:
coordinating displaying, on the first webpage that is external to the website of the retailer, an advertisement for an advertised item that is available for purchase on the website of the retailer, wherein the one or more items comprise the advertised item; and
obtaining the URL of the first webpage that is shown on the graphical user interface of the user and that is external to the website of the retailer comprises:
obtaining the URL of the first webpage when the user selects the advertisement for the advertised item displayed on the first webpage and is directed to the website of the retailer.

14. The method of claim 11, wherein:
coordinating displaying the one or more items on the second webpage to promote the one or more items as related to the interest of the user comprises:
coordinating displaying the one or more items on the second webpage during a first session on a web browser on the graphical user interface of the user to promote the one or more items as offered for sale by or on behalf of the retailer and related to the interest of the user; and
the method further comprises:
using a beacon tracking cookie to determine that the user has initiated a second session on the web browser; and
coordinating displaying the one or more items on a third webpage during the second session on the web browser.

15. The method of claim 11, wherein the second webpage comprises one of:
an internal webpage of the retailer; or
an external webpage of a third-party.

16. The method of claim 11, wherein processing the web text displayed on the first webpage on the graphical user interface of the user to determine the interest of the user comprises:
tokenizing the web text displayed on the first webpage;
removing any first stop words from the web text displayed on the first webpage on the graphical user interface of the user; and
creating a reference document comprising the web text, as tokenized, with the any of the first stop words removed from the web text.

17. The method of claim 16, wherein:
the method further comprises, for each category of items of multiple categories of items available for purchase at the website of the retailer, processing description text for the category of items by:
tokenizing the description text for the category of items;
removing any second stop words from the description text for the category of items; and
creating a category document comprising the description text, as tokenized, with the any of the second stop words removed from the description text;
the set of rules further comprises:
combining (1) the category document and (2) the reference document for each category of items of the multiple categories of items into the corpus;
determining Euclidean distances between a user distribution of topics and a category distribution of topics for each category of items of the multiple categories of items; and
selecting the one or more items from a first category of items of the multiple categories of items comprising a first category distribution of topics that is closest to the user distribution of topics; and
performing the LDA estimation on the corpus further comprises:
performing the LDA estimation on the corpus to obtain (1) the user distribution of topics for the user and (2) the category distribution of topics for each category of items of the multiple categories of items.

18. The method of claim 11, wherein validating the LDA estimation comprises:
creating a history document comprising descriptions of one or more historic items in the user behavior history of the user;
creating a random document comprising descriptions of one or more randomly selected items from an item catalogue of the retailer; and
comparing the history document to a reference document comprising web text displayed on the first webpage on the graphical user interface of the user;
comparing the random document to the reference document; and
validating the LDA estimation based on the comparisons between (1) the history document and the reference document and (2) the random document and the reference document.

19. The method of claim 11, wherein validating the LDA estimation comprises:
determining a recommendation success rate (RSR) using the user behavior history of the user; and
validating the LDA estimation based on the recommendation success rate.

20. The method of claim 19, wherein determining the RSR comprises using an equation comprising:

$$RSR = \frac{NDP}{NDR},$$

wherein:
   the NDP comprises a number of categories of purchased items in the user behavior history of the user; and
   the NDR comprises a number of categories of the one or more items.

* * * * *